United States Patent Office 2,727,060
Patented Dec. 13, 1955

2,727,060

2,2'-CARBALKOXYMETHYLENE-BIS-INDANDIONE-(1.3)

Willy Stoll and Franz Litvan, Basel, Switzerland, assignors to J. R. Geigy A. G., Basel, Switzerland, a Swiss firm No Drawing. Application March 15, 1954,
Serial No. 416,379

Claims priority, application Switzerland June 12, 1953

6 Claims. (Cl. 260—469)

It is known that after peroral application of even very slight doses, 3.3'-methylene-bis-4-hydroxycoumarin has a strong retarding action on the coagulation of the blood due to its hypoprothrombinemic action. On the other hand, according to trials made by K. F. Jansen and K. A. Jensen, Hoppe-Seylers Zeitschrift für physiologische Chemie, 277, 66 (1942), 2.2'-methylene-bis-indandione-(1.3) is nearly inactive.

It has now been found that 2.2'-carbalkoxymethylene-bis-indandiones-(1.3) which have not been known up to now, of the general formula:

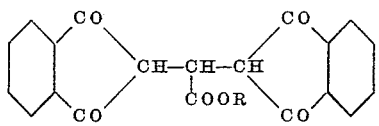

wherein R represents an alkyl radical, have a very strong retarding action on the coagulation of the blood. Bearing in mind the necessity for a therapy and prophylactic treatment, e. g. of thrombotic symptoms, which is as little dangerous as possible, it is further of importance that after interrupting the medication of the new compounds, the prothrombin level of the blood rises again to a normal level in a short time. In the series of the hydroxycoumarin derivatives, also 3.3'-carbethoxymethylene-bis-4-hydroxycoumarin possesses this latter property which is of great therapeutical advantage. However, to attain the same action, considerably higher doses must be given than of 3.3'-methylene-bis-4-hydroxycoumarin. It is all the more surprising that by the introduction of a carbalkoxy group into the practically inactive 2.2'-methylene-bis-indandione-(1.3), compounds are obtained which, in similar small doses, have the same action as the highly active 3.3'-methylene-bis-4-hydroxycoumarin.

The new compounds can be produced in various ways, for most of which processes however, indandione-(1.3), or 2-carbalkoxy-indandiones-(1.3) which result as intermediate products in the production thereof, can be used as starting materials.

For example, 2 mols of indandione-(1.3) can be reacted with one mol of a glyoxylic acid alkyl ester or a functional derivative of such with regard to the aldehyde group, e. g. with the oxime, an alcoholate or the bisulphite addition compound of a glyoxylic acid alkyl ester or with a dialkoxy acetic acid or dihalogen acetic acid alkyl ester.

In the latter case, it is of advantage to react two mols of an alkali salt, preferably the indandione-(1.3) potassium salt with one mol of a dihalogen acetic acid alkyl ester, e. g. a dichloracetic acid alkyl ester, the reaction for example being performed in an anhydrous medium, e. g. in benzene, xylene or in the alcohol corresponding to the alcohol component of the dihalogen acetic acid ester.

It is generally of advantage to perform the reactions in inert solvents or diluents. In choosing the reaction conditions, it should be remembered that indandione-(1.3) condenses easily with itself, i. e. a keto group of a molecule condenses with the reactive methylene group of a second molecule.

Finally also 2.2'-carboxymethylene - bis - indandione-(1.3) (bis-indandione-(1.3)-yl-(2)-acetic acid) can be converted into the corresponding alkyl ester by using the usual mild esterification methods. For example, the acid can be reacted with the alcohol desired as ester component in the presence of a dehydrating agent, e. g. hydrogen chloride. Further, the acid in the form of an alkali salt or of the silver salt can be reacted with an alkyl halide, dialkyl sulphate, toluene sulphonic acid alkyl ester or with an alkali salt of an alkyl sulphuric acid. In addition, e. g. the acid can also be esterified with diazomethane. 2.2'-carboxymethylene-bis-indandione-(1.3) can be produced in various ways, of which the condensation of 2 mols of indandione-(1.3) with one mol of glyoxylic acid, and the reaction of 2 mols of an alkali compound of 2-carbethoxy-indandione-(1.3) with one mol of dichloracetic acid ethyl or methyl ester followed by saponification and decarboxylation, can be named.

The production of the new compounds is illustrated in the following example. Where not otherwise stated, parts are given as parts by weight and the temperatures are in degrees Centigrade. The relationship of parts by weight to parts by volume is as that of grammes to cubic centimetres.

*Example*

14.6 parts of indandione-(1.3) are suspended in 100 parts by volume of benzene and a solution of 5.1 parts of glyoxylic acid ethyl ester in 50 parts by volume of benzene is added. The mixture thus obtained is heated under reflux with a water separator attached until the splitting off of water which occurs after a short time ceases. The residue obtained after distilling off the benzene is recrystallised several times from ethanol. 2.2'-carbethoxymethylene-bis-indandione-(1.3) is obtained in the form of yellowish crystals. M. P. 181–183°.

2.2'-carbomethoxymethylene-bis-indandion-(1.3), 2.2'-carbopropoxymethylene - bis - indandione - (1.3) (M. P. 155°), carboisopropoxymethylene-bis-indandione-(1.3) (M. P. 175–176°) and carbobutoxymethylene-bis-indandione-(1.3) for example can be produced in an analogous manner.

The new indandione derivatives prepared according to the invention may be made into pharmaceutical compositions by admixture thereof with suitable and compatible pharmaceutical carriers.

Those pharmaceutical compositions are of special importance which are in the form of capsules, powders, tablets or any other form which is suitable for administration per os. The compositions may be obtained by admixing the active ingredient, i. e. the new indandione derivatives, with pharmaceutical carriers such as cornstarch, lactose, stearic acid, talc, magnesium stearate, etc. The compositions may be pressed into tables which, if desired, can be notched to break into halves or quarters. One dosage unit may contain for example 10 to 40 mg., preferably 20 mg., of active ingredient.

What we claim is:

1. 2.2'-carbalkoxymethylene-bis-indandione-(1.3) corresponding to the formula:

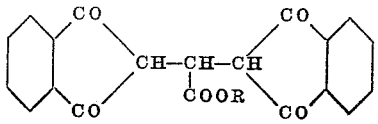

wherein R represents an alkyl radical containing at most four carbon atoms.

2. 2.2'-carbethoxymethylene-bis-indandione-(1.3).
3. 2.2'-carbomethoxymethylene-bis-indandione-(1.3).
4. 2.2'-carbopropoxymethylene-bis-indandione-(1.3).
5. 2.2'-carboisopropoxymethylene-bis-indandione-(1.3).
6. 2.2'-carbobutoxymethylene-bis-indandione-(1.3).

OTHER REFERENCES

Burger: Medicinal Chemistry, vol. 1, pgs. 263–264, Interscience, 1951, N. Y.